United States Patent
Giacobone

(10) Patent No.: US 9,242,755 B1
(45) Date of Patent: Jan. 26, 2016

(54) BAG HOLDER

(71) Applicant: Nicholas Giacobone, Huntington Beach, CA (US)

(72) Inventor: Nicholas Giacobone, Huntington Beach, CA (US)

(*) Notice: Subject to any disclaimer, the term of this patent is extended or adjusted under 35 U.S.C. 154(b) by 0 days.

(21) Appl. No.: 14/294,134

(22) Filed: Jun. 2, 2014

Related U.S. Application Data

(60) Provisional application No. 61/829,954, filed on May 31, 2013.

(51) Int. Cl.
*A63B 55/04* (2006.01)
*B65B 67/12* (2006.01)
*B65B 5/06* (2006.01)
*B62B 1/26* (2006.01)

(52) U.S. Cl.
CPC ............. *B65B 67/1205* (2013.01); *B62B 1/266* (2013.01); *B65B 5/067* (2013.01); *B65B 67/12* (2013.01)

(58) Field of Classification Search
CPC  B65B 67/1205; B65B 67/12; B65B 67/1222; B65B 39/06; B62B 1/266; B62B 2202/22
USPC ................ 248/97, 99, 95, 100; 224/191, 928; 220/628, 908
See application file for complete search history.

(56) References Cited

U.S. PATENT DOCUMENTS

| | | | | |
|---|---|---|---|---|
| 4,911,397 A | * | 3/1990 | Waterhouse | H01P 1/00 248/610 |
| 5,797,567 A | | 8/1998 | Magnafici | |
| 5,899,419 A | * | 5/1999 | Ross | B65B 67/1205 248/97 |
| 6,076,566 A | * | 6/2000 | Lowe | B65B 67/1222 141/10 |
| 6,131,861 A | * | 10/2000 | Fortier, Jr. | B62B 1/266 248/100 |
| 6,543,732 B1 | * | 4/2003 | Yuan | B65F 1/1415 248/101 |
| 9,033,291 B2 | * | 5/2015 | Branham | B65B 67/1211 248/100 |

\* cited by examiner

*Primary Examiner* — Todd M Epps
(74) *Attorney, Agent, or Firm* — Eric Karich; Karich & Associates

(57) ABSTRACT

A bag holder has a mounting ring and a base. The mounting ring has an outer perimeter, an inner perimeter, and a width that together are shaped to frictionally engage a perimeter of a plastic bag on the mounting ring when the perimeter is stretched over the mounting ring, which results in the plastic bag being removably hung from the mounting ring. The base supports the mounting ring above a surface, and has a height such that the plastic bag is held substantially above the surface when the perimeter of the plastic bag is stretched over the mounting ring, but the bottom portion of the plastic bag rests partially on the surface.

2 Claims, 7 Drawing Sheets

BAG HOLDER

CROSS-REFERENCE TO RELATED APPLICATIONS

This application for a utility patent claims the benefit of U.S. Provisional Application No. 61/829,954, filed May 31, 2013.

BACKGROUND OF THE INVENTION

1. Field of the Invention

This invention relates generally to holders, and more particularly to a bag holder for holding a resealable bag.

2. Description of Related Art

The prior art teaches various forms of holders for holding bags. In particular, Magnifico, U.S. Pat. No. 5,797,567, teaches a bag holder that includes a base structure that includes two stanchions that support clips. The clips may be attached to either side of the bag, for holding the bag upright. One problem with this device is that the device holds the bag entirely off the counter, so that the entire weight of the bag and contents are supported by the holder. This weight is often too much for the device, and the clip structure slips, dropping the bag and spilling the contents of the bag. Another problem is that the bag is not properly held open, and the contents (often food) can contaminate the zipper structure of the bag.

The prior art teaches clip-type bag holders. However, the prior art does not teach a bag holder having the structure and advantages of the present invention. The present invention fulfills these needs and provides further advantages as described in the following summary.

SUMMARY OF THE INVENTION

The present invention teaches certain benefits in construction and use which give rise to the objectives described below.

The present invention provides a bag holder for holding a plastic bag. The bag holder includes a mounting ring, and a base for supporting the mounting ring. The mounting ring has an outer perimeter, an inner perimeter, and a width that enables the plastic bag to be inserted through the mounting ring and wrapped over the mounting ring for removably hanging the plastic bag from the mounting ring. The base supports the mounting ring above the surface, the base having a height such that the plastic bag is held substantially above the surface but rests partially on the surface.

A primary objective of the present invention is to provide a bag holder having advantages not taught by the prior art.

Another objective is to provide a bag holder that holds the plastic bag open in a convenient manner that enables items to be inserted into the plastic bag quickly and easily.

Another objective is to provide a bag holder that holds the perimeter of the plastic bag in a folded position so that the contents of the plastic bag do not contaminate the resealable zipper of the plastic bag.

Another objective is to provide a bag holder that is inexpensive to manufacture and easy to use.

A further objective is to provide a bag holder that supports the plastic bag substantially above the surface but rests partially on the surface so that the weight of the items in the plastic bag is partially supported by the surface.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

The above-described drawing figures illustrate the invention, a bag holder 10 for holding a bag 12 in an open position for inserting items into the bag 12. The bag holder 10 may be used with any form of bag (e.g., food storage bag, trash bag, etc.), but is particularly adapted for use with resealable plastic bags (e.g., ZIPLOCK® bags), and the like. While the bag 12 is typically referred to as a plastic bag, this term is hereby defined to include any form of bag, regardless of its material. The bag holder 10 is particularly suited for use in the kitchen, inserting foods (e.g., sandwiches, soups, leftovers, etc.), but may be used in any other manner (e.g., in the garage inserting nuts and bolts into bags, etc.).

Figure 1:
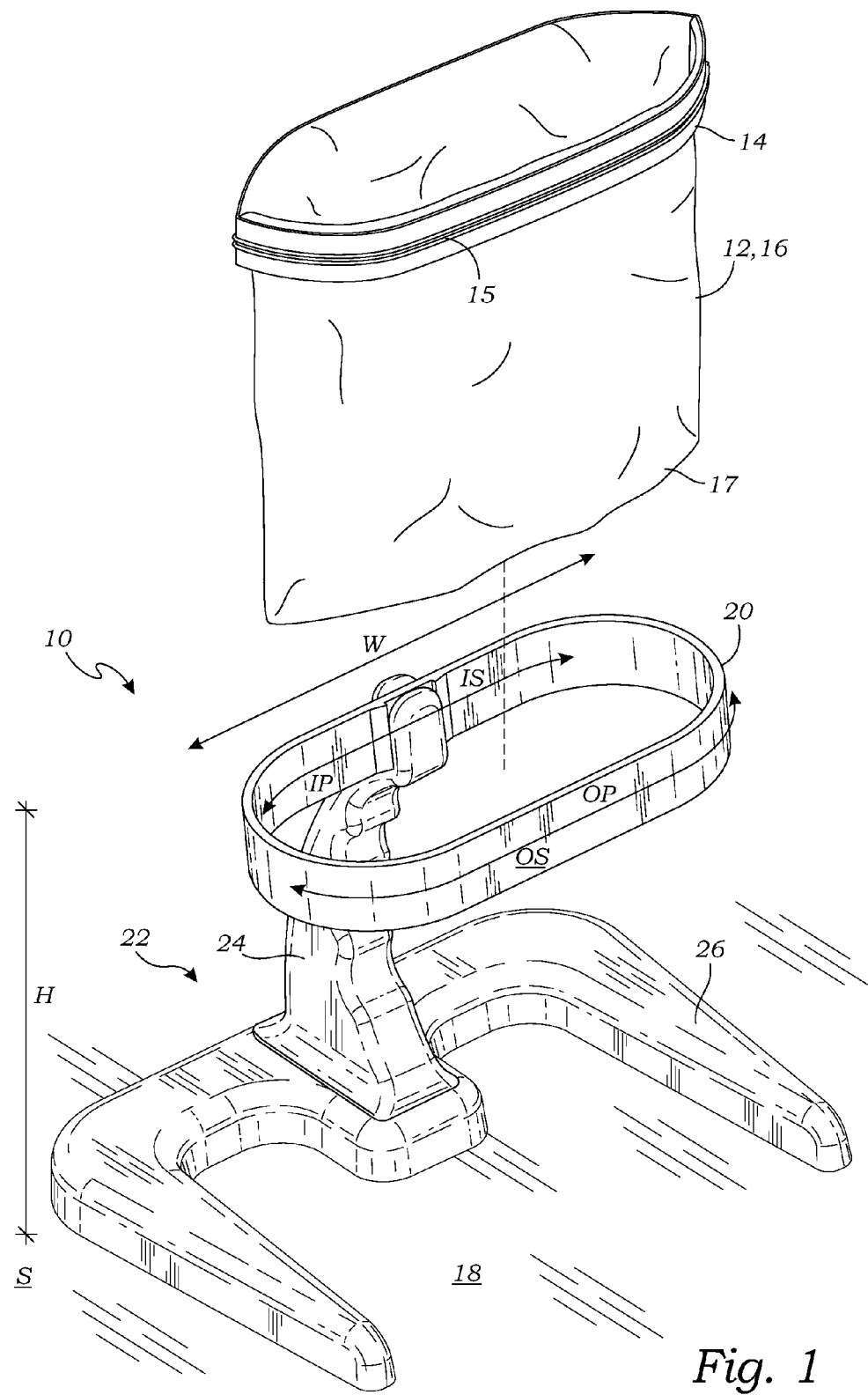
FIG. 1 is a perspective view of a bag holder according to one embodiment of the present invention, illustrating a plastic bag being mounted on a mounting ring having an oval shape.
Figure 2:
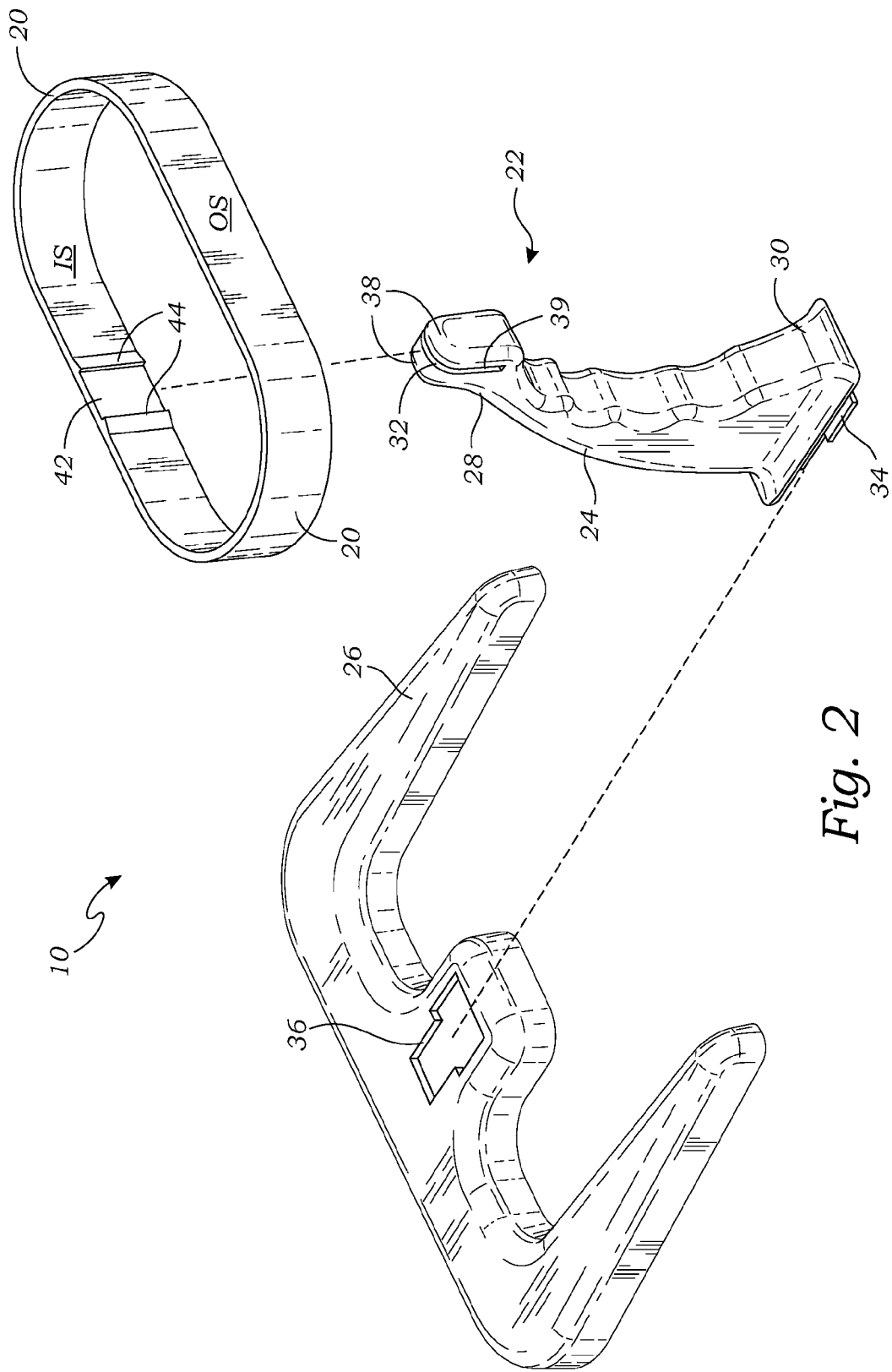
FIG. 2 is an exploded perspective view of the bag holder, illustrating components of the bag holder, including a vertical handle portion and a leg structure.

FIG. 1 is a perspective view of the bag holder 10 according to one embodiment of the present invention, illustrating the plastic bag 12 being mounted on a mounting ring 20 of the bag holder 10. FIG. 2 is an exploded perspective view of the bag holder 10, illustrating further components of the base 22, which is adapted for supporting the mounting ring 20 above a surface 18 (e.g., a countertop, floor, or other surface or structure). As illustrated in FIGS. 1-2, the bag holder 10 may include multiple components that may be assembled into the final product, although in an alternative embodiment it may have a one-piece construction.

Figure 8:
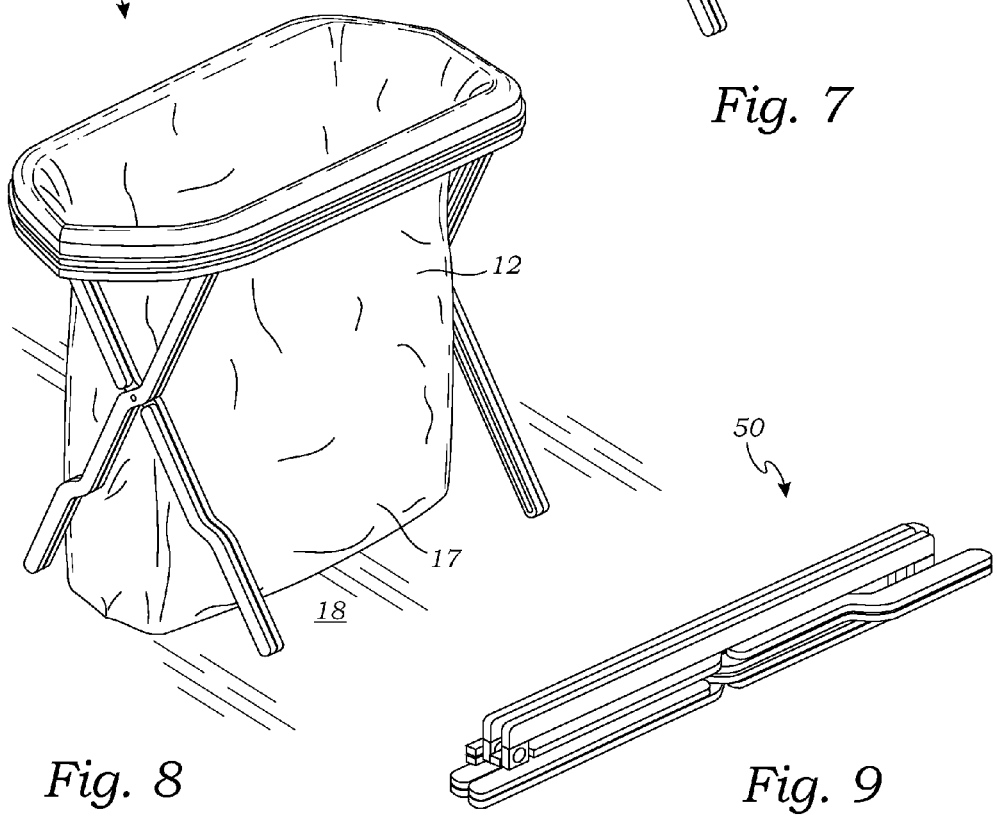
FIG. 8 is a perspective view thereof illustrating the plastic bag mounted thereupon.

In the embodiment of FIGS. 1-2, the mounting ring 20 has an oval construction, and the base 22 includes a vertical handle portion 24 and a leg structure 26. The mounting ring 20 has an outer perimeter OP, an inner perimeter IP, and a width W. The width W and the outer perimeter OP of the mounting ring 20 are sized and shaped to frictionally engage the perimeter 14 of the plastic bag 12 when the perimeter 14 is wrapped around the mounting ring 20, so that the resealable zipper 15 is facing outwardly, and the plastic bag 12 hangs from the mounting ring 20. The plastic bag 12 includes a bag body 16 that includes a bottom portion 17. In the preferred embodiment, the bottom portion 17 of the plastic bag 12 is supported by the surface 18 while the plastic bag 12 is being filled (as shown in FIG. 8). The mounting ring 20 may have any suitable shape, including round, oval, rectangular, or any other shape that may be desired that functions as described herein. Some examples of alternative shapes are provided below.

The base 22 may be of any construction and configuration that supports the bag 12, and the base 22 has a height H that supports the plastic bag 12 at supported substantially above the surface 18 when mounted on the mounting ring 20, at a height H that is great enough to facilitate filling the plastic bag 12, but preferably at a low enough height that the plastic bag 12 is at least somewhat supported by the surface 18. For purposes of this application, the term "substantially above the surface" is hereby defined to mean that the plastic bag 12 is at least mostly above the surface 18 (more than 50%), and preferably at least 80-90%, or more, so that the plastic bag 12 may be substantially filled, while at least some of the weight may be borne by the surface 18, reducing the strain placed upon the bag holder 10.

In the embodiment of FIGS. 1-2, the base 22 includes a vertical handle portion 24 and a leg structure 26 that supports the vertical handle portion 24 upright. The vertical handle portion 24 may have an elongate body, a top end 28, and a bottom end 30. The elongate body may include an outer surface having contours that are suitable for grasping by the human hand, but other shapes may also be used.

The top end 28 includes an upper engaging structure 32 shaped to lockingly engage the mounting ring 20, and wherein the bottom end 30 includes a lower engaging structure 34 that engages another engaging structure 36 of the leg structure 26. In the embodiment of FIGS. 1-2, the upper engaging structure 32 of the vertical handle portion 24 may include a pair of upwardly extending portions 38 separated by a slot 39, the slot 39 being sized and shaped to frictionally engage on either side of the mounting ring 20. The upper engaging structure 32 may, in this embodiment, engage a niche area 42 of the mounting ring 20, discussed in greater detail below.

The lower engaging structure 34 is shaped to engage another engaging structure 36 of the base 22. In this embodiment, the lower engaging structure 34 includes a flange, and the other engaging structure 36 of the base 22 includes a receiver, and the flange slidably interlocks with the receiver to removably mount the vertical handle portion 24 on the base 22.

In the embodiment of FIGS. 1-2, the leg structure 26 may include a traverse body having two legs that are spaced wide enough to provide solid support. In this embodiment, the leg structure 26 is generally U-shaped. Obviously alternative constructions may also be used, and should be considered within the scope of the present invention.

Figure 3:
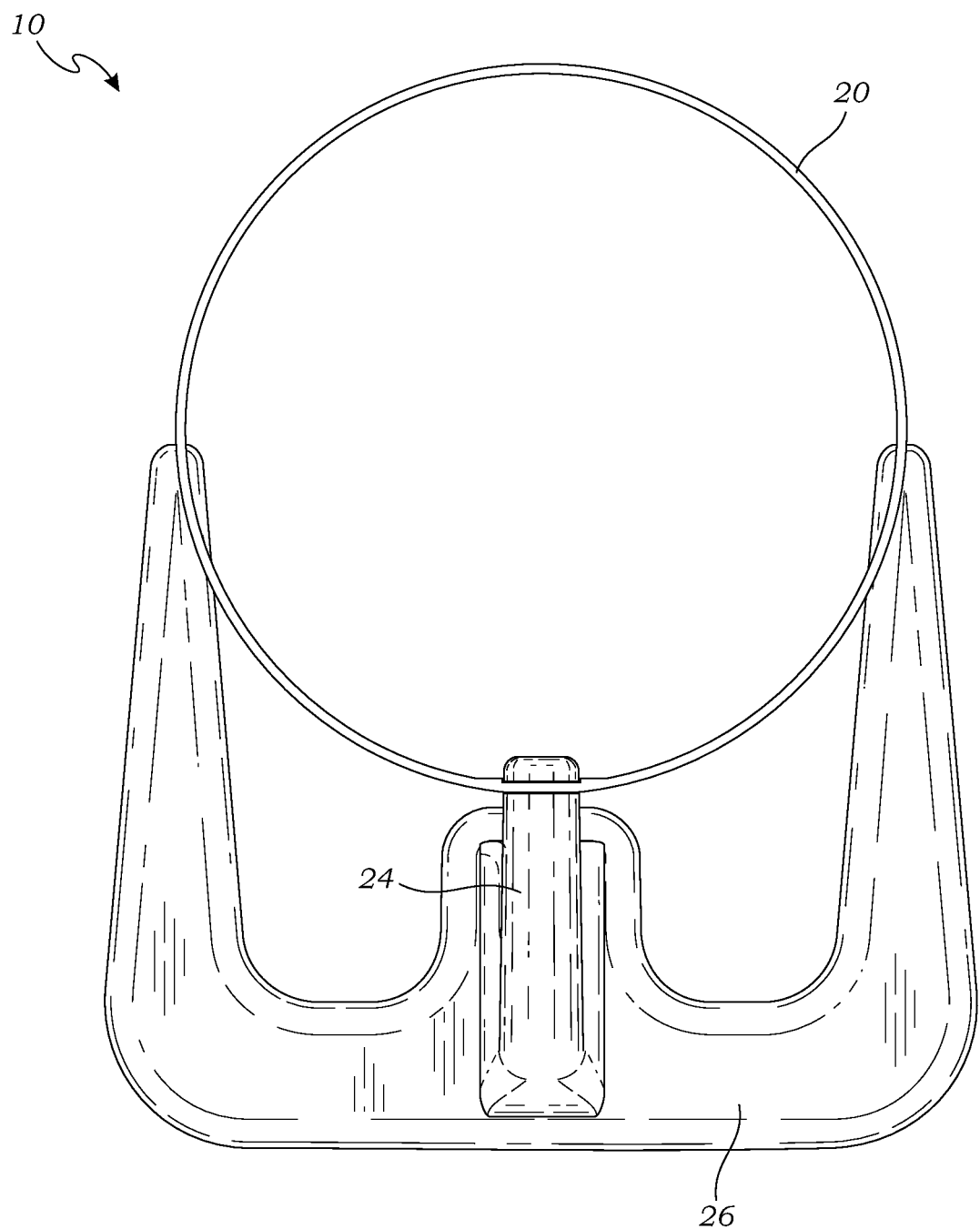
FIG. 3 is a top plan view of another embodiment of the bag holder, wherein the mounting ring is round in shape.
Figure 4:
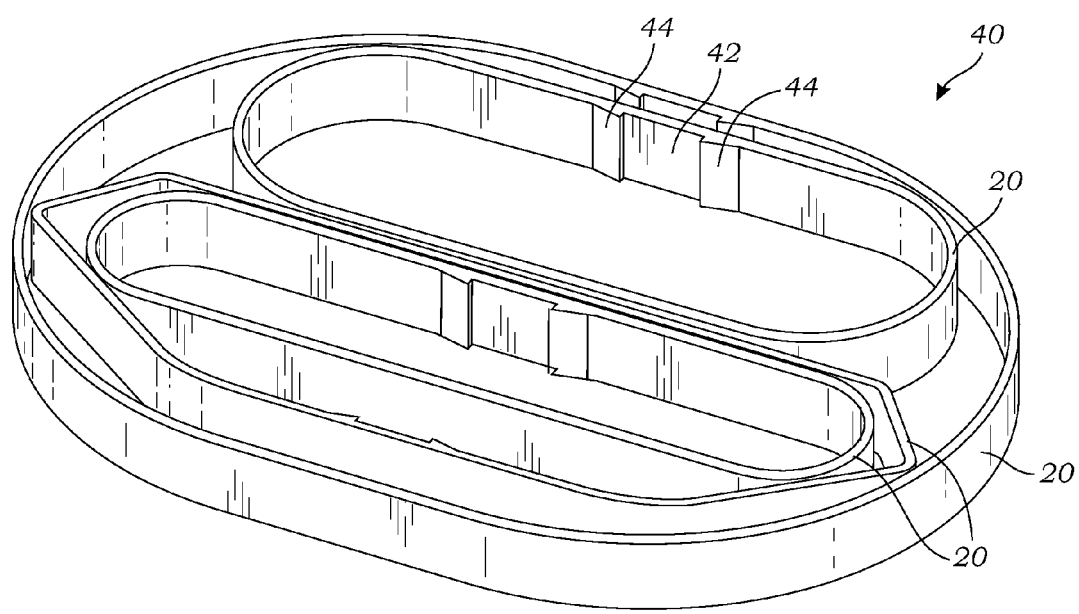
FIG. 4 is a perspective view of an assortment of mounting rings having different shapes for holding the plastic bag in different configurations.

FIG. 3 is a top plan view of another embodiment of the bag holder 10, illustrating a second embodiment of the mounting ring 20, which is round. FIG. 4 is a perspective view of an assortment of various alternative mounting rings 40 having different shapes for holding the plastic bag 12 in different configurations. As illustrated in FIGS. 3-4, the mounting ring 20 of the bag holder 10 may have a variety of shapes. In the embodiment of FIG. 3, the round shape enables the easier insertion of certain items. For purposes of this application, the term "items" is defined to include any form of items, materials, liquids, or anything else that one might want to store in this type of plastic bag 12 (e.g., food items, sandwiches, leftovers of any kind, and any non-food items, such as nuts/bolts, craft supplies, and anything else that may be desired).

This invention is particularly useful in assisting in the storing of leftover foods, including any forms of soups, casseroles, and other items that might otherwise be difficult to insert into the plastic bag 12.

In the embodiment of FIG. 4, the different shapes of the mounting rings 20 nest within each other for storage, and yet enable a wide selection of configurations that facilitate storing different items. Also illustrated in FIG. 4, in one embodiment, each of the mounting rings 20 includes a niche area 42 that traverses the mounting ring 20 and is defined by two raised portions 44, one on either side of the niche area 42. As discussed above, the niche area 42 is used to removably mount the mounting ring 20 on the vertical handle portion 24.

Figure 5:
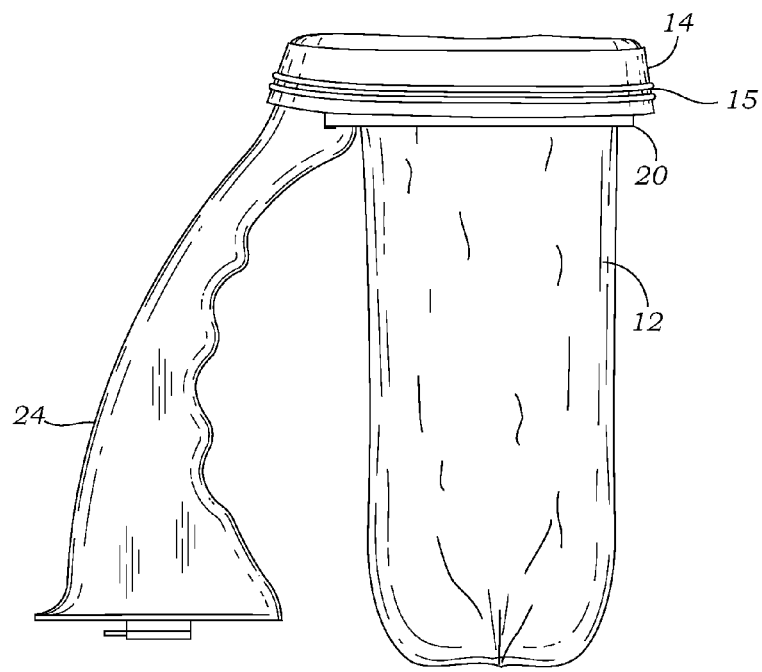
FIG. 5 is a side elevational view of the plastic bag mounted on the mounting ring, and the mounting ring mounted on the vertical handle portion, but the vertical handle portion being separated from the leg structure.

FIG. 5 is a side elevational view of the plastic bag 12 mounted on the mounting ring 20, and the mounting ring 20 mounted on the vertical handle portion 24, but the vertical handle portion 24 being separated from the leg structure 26. As illustrated in FIG. 5, once the plastic bag 12 has been mounted on the mounting ring 20, the perimeter 14 of the plastic bag 12 wraps around and frictionally engages with the mounting ring 20. This also places the resealable zipper 15 facing outwardly, so that it remains clean of any materials (e.g., food) inserted into the plastic bag 12 during the filling process. The vertical handle portion 24 can be used as a handle to easily carry the plastic bag 12 and position it for filling.

Figure 6:
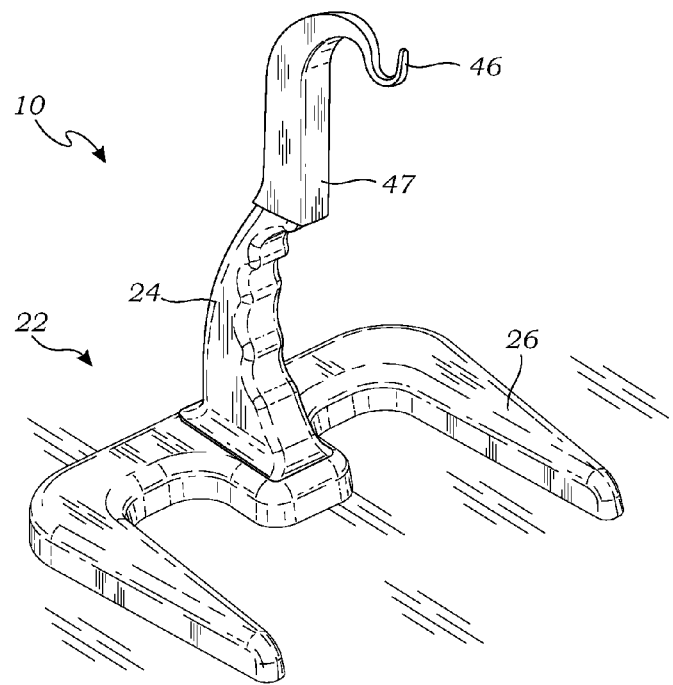
FIG. 6 is a perspective view of the bag holder of FIG. 1, wherein the mounting ring has been replaced with a hanging hook.

FIG. 6 is a perspective view of the bag holder 10 of FIG. 1, wherein the mounting ring 20 has been replaced with a hanging hook 46. As illustrated in FIG. 6, a receiver 47 of the hanging hook 46 engages the upper engaging structure 32 for mounting the hanging hook 46 on the base 22. The hanging hook 46 extends horizontally outward (i.e., in the direction of the two legs 26 of the base 22) for hanging fruit or other items on the base 22, when the bag holder 10 is not being used for filling plastic bags.

Figure 7:
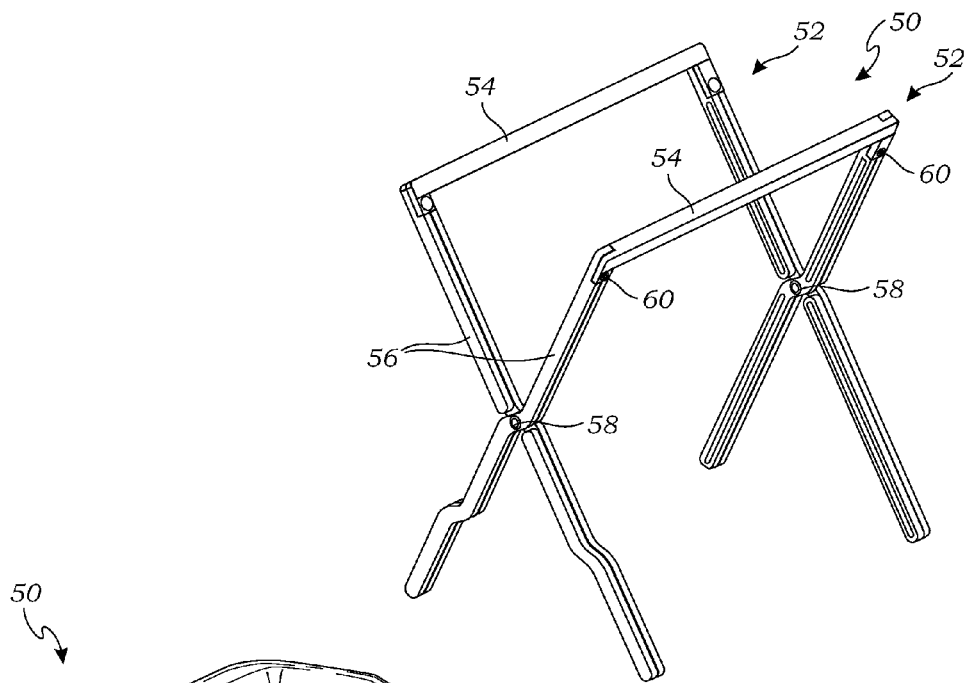
FIG. 7 is a perspective view of another embodiment of the bag holder in an upright configuration.
Figure 9:
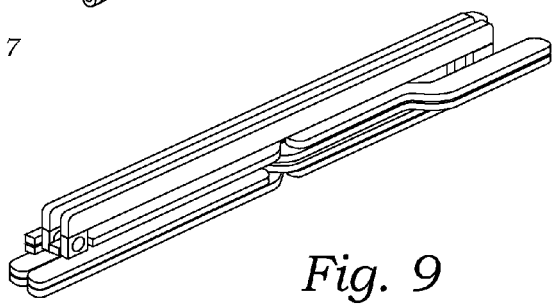
FIG. 9 is a perspective view of the bag holder of FIG. 7 in a collapsed configuration.

FIG. 7 is a perspective view of another embodiment of the bag holder 50 in an upright configuration. FIG. 8 is a perspective view thereof illustrating the plastic bag 12 mounted thereupon. FIG. 9 is a perspective view of the bag holder 50 of FIG. 7 in a folded configuration. This embodiment includes two hinged elements 52 that each includes a lateral bar 54 with legs 56 at either end. The legs 56 of the hinged elements 52 are joined with a connecting hinge 58. The legs 56 are each connected to the lateral bar 54 via a folding hinge 60 to enable the folding of the holder 50 down to a very small size for storage and shipping.

Figure 10:
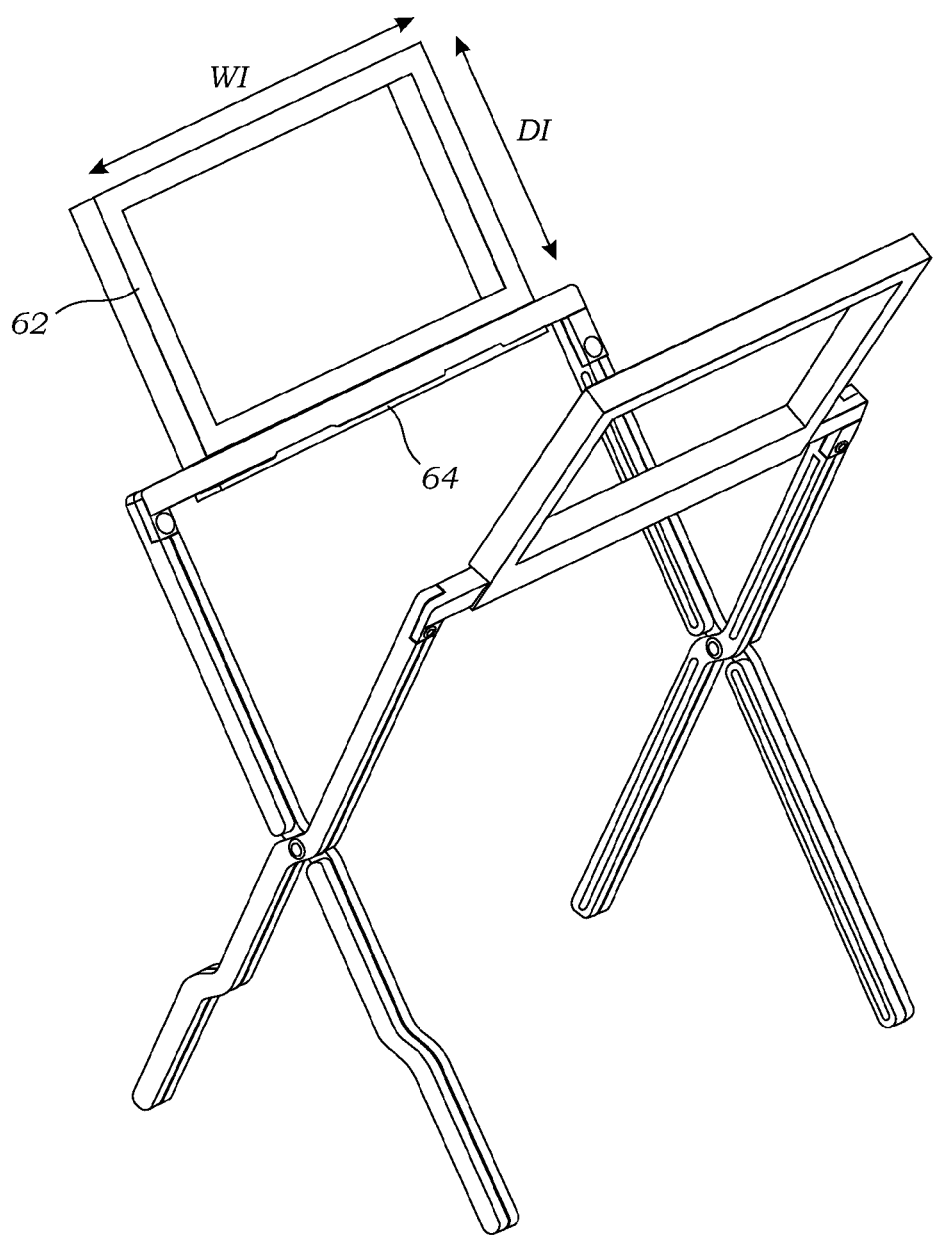
FIG. 10 is a perspective view of the bag holder of FIG. 7 with extender panels clipped thereupon.

FIG. 10 is a perspective view of the bag holder 50 of FIG. 7 with extender panels 62 clipped thereupon. The extender panels 62 clip on to the bag holder 10 with a clip portion 64, and extend outwardly a distance DI. A width WI of the extender panel 62 is less that the width of the bag holder 10, enabling smaller bags to be attached to the bag holder 10 via the extender panels 62.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A bag holder comprising:
   a mounting ring;

a base for supporting the mounting ring above the surface, the base comprising a vertical handle portion and a leg structure that supports the vertical handle portion upright upon the surface; and wherein the vertical handle portion includes a top end that includes an upper engaging structure shaped to lockingly engage the mounting ring, and wherein the upper engaging structure of the vertical handle portion includes a pair of upwardly extending portions separated by a slot, the slot being sized and shaped to frictionally engage on either side of the mounting ring.

2. A bag holder for holding a plastic bag in an open position on a surface for inserting items into the plastic bag, the plastic bag having a perimeter, a bag body, and a bottom portion, the bag holder comprising:

a mounting ring;

a niche area that traverses the mounting ring and is defined by two raised portions, one on either side of the niche area;

a vertical handle portion having an elongate body, a top end, and a bottom end, wherein the top end includes an upper engaging structure shaped to lockingly engage the mounting ring;

a leg structure that supports the vertical handle portion upright upon the surface; and wherein the upper engaging structure of the vertical handle portion includes a pair of upwardly extending portions separated by a slot, and the pair of upwardly extending portions fit on either side of the niche area such that the slot receives the mounting ring.

\* \* \* \* \*